June 20, 1933.  J. C. CROWLEY  1,915,122

PRESSURE GAUGE

Filed Oct. 6, 1930

Inventor:
John C. Crowley
Kwis Hudson + Kent
attys.

Patented June 20, 1933

1,915,122

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

PRESSURE GAUGE

Application filed October 6, 1930. Serial No. 486,715.

This invention relates to a fluid pressure gauge for measuring the pressure of fluid in a container, and more particularly to a gauge for measuring the pressure of air in a pneumatic tire.

An object of the invention is to provide a gauge of this character that is accurate and may be economically manufactured, since it is composed of a relatively few number of parts of simple and inexpensive construction.

A further object is to provide a gauge of this character wherein a portion of the gauge casing is formed of transparent material to disclose the position of one of the operative parts of the gauge.

A further object is to provide a gauge of this type wherein the gauge casing is substantially completely closed, thereby lessening the likelihood of dirt or other foreign matter working into the gauge and thus affecting its accuracy of operation.

Additional objects and advantages will become apparent during the following detailed description of an embodiment of the invention.

In the accompanying drawing illustrating an embodiment of the invention,

Figure 1:
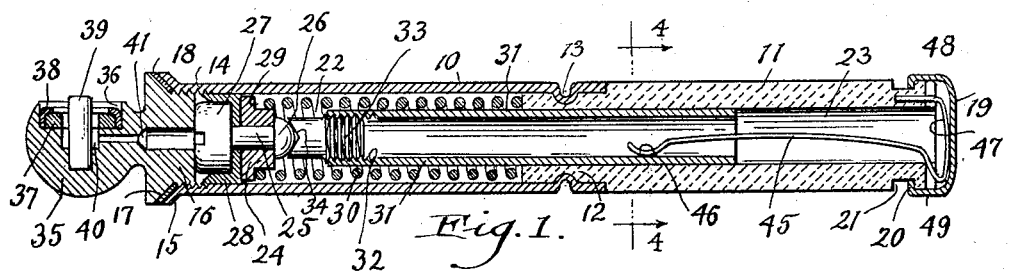
Figure 1 is a longitudinal sectional view thereof.

The gauge casing is formed of two main parts; namely, the part 10 which is preferably metallic, and the part 11 which is made of a suitable transparent material.

The part 11 of the casing has a reduced portion 12 fitting into an end of the part 10, the two parts being held together in assembled relation by means of an annular groove 13 in the part 10 engaging in an annular groove in the part 11. The end of the part 10 of the casing abuts the shoulder formed at the inner end of the reduced portion 12 of the part 11, while the outer surfaces of the parts 10 and 11 are preferably flush as clearly indicated in the drawing.

The end of the part 10 opposite to the end that is secured to the part 11 is internally threaded as indicated at 14 and is also provided with a flared portion 15. This end of the casing is closed by a threaded plug member 16 provided with a tapered flange portion 17, whereby when the plug 16 is tightly screwed into the open end of the casing a flexible packing 18 will be securely clamped between the flared portion 15 of the casing and the tapered flange 17 of the plug 16.

The opposite end of the casing, or more specifically the end of the part 11 thereof farthest removed from the part 10, is closed by means of a cap member 19 which is preferably formed of flexible metal and fits over the end of the part 11 of the casing, being retained thereon by means of an inturned flange 20 engaging in an annular groove 21 formed in the exterior of the part 11 adjacent the end thereof.

It will be seen that the construction of the casing is such that it is substantially closed, there being no slots or openings formed therein to permit certain of the movable parts of the gauge to extend outwardly of the casing. This construction reduces the likelihood of dirt or other foreign matter getting into the gauge and hindering the effective and accurate operation thereof.

The parts 10 and 11 of the casing are provided with bores 22 and 23 respectively, it being noted that the bore 23 in the part 11 is of smaller diameter than the bore 22 in the part 10.

A block 24 is slidably arranged in the bore 22 of the part 10, this block being provided with a stud 25 having a head 26 at its inner end and a nut 27 on its outer end. The end of the stud 25 that carries the nut projects a distance outwardly of the block 24 toward the plug 16, so that a cup-shaped flexible packing 28 may be clamped on the stud 25 between the nut 27 and the block 24 to thereby form a piston head.

The block 24 is provided with an annular shoulder 29 upon which bears one end of a spring 30. The opposite end of said spring bears against the inner end of the part 11 of the casing. It should be noted that before this spring is assembled in the casing, as just described, the same is properly calibrated or tensioned to enable the gauge to render accurate pressure readings.

A relatively elongated sleeve 31 is slidably arranged in and guided by the bore 23 of the part 11 of the casing and projects from said bore into the bore 22 of the part 10 of the casing. The end of the sleeve 31 projecting into the part 10 of the casing is internally threaded as indicated at 32 and has attached thereto a threaded pin 33, the outer end of such pin being notched as indicated at 34 so as to bear upon the head 26 of the stud 25 when the parts of the gauge are in the position shown in Fig. 1. It will be seen that the pin 33 may be adjusted relative to the sleeve 31 which adjustment may be made in order to properly position the sleeve 31 when the pin is in engagement with the head 26 of the stud 25.

The plug 16 is provided with an extension 35 forming the air chuck by means of which the gauge is attached to the valve stem of a pneumatic tire or container. The extension 35 has at one side thereof a countersink 36 within which is arranged a flexible packing 37 held in place by means of an inverted cup member 38. A pin 39 carried by the extension 35 projects outwardly of the extension through an opening in the packing 37 and an opening in the retaining member 38. The openings in the retaining member and packing communicate with a recess 40 surrounding the pin 39, which recess in turn communicates with a passageway 41 extending through the extension 35 and the plug 16 longitudinally into the casing of the gauge. This construction is well understood in the art and per se forms no part of the present invention except in so far as it provides a closure for one end of the casing.

When the gauge is applied to a valve stem the pin 39 depresses the valve pin while the packing 37 effects an airtight connection between the stem and the extension 35. The air within the container may then pass through the recess 40 and passage 41 of the plug 16 and extension 35 into the casing of the gauge.

The fluid pressure acting on the piston head formed by the packing 28 and block 24 moves such piston head inwardly of the casing against the tension of the spring 30. The pin 33 carried by the sleeve 31 being in contact with the head 26 of the stud 25 carried by the block 24, the sleeve 31 within the bore 23 of the part 11 of the casing moves in an amount equal to the movement of the piston head.

The part 11 of the casing being formed of transparent material, the position of the end of the sleeve 31 may be readily seen through the part 11.

Figure 2:
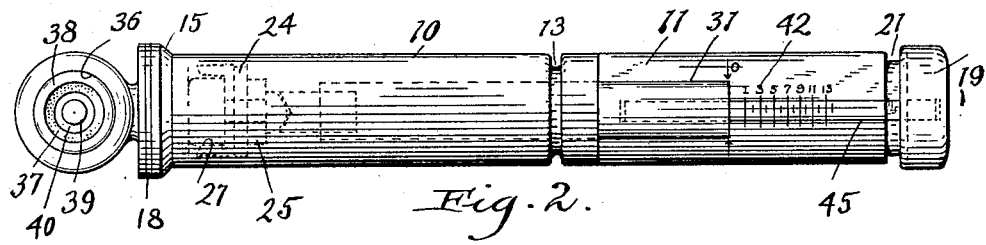
Fig. 2 is an elevational view of the gauge.
Figure 3:
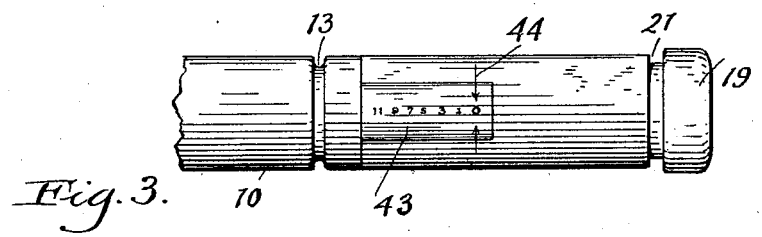
Fig. 3 is a fragmentary elevational view of a slightly modified form of gauge.
Figure 4:
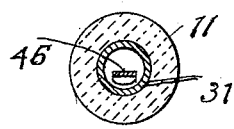
Fig. 4 is a transverse sectional view taken substantially on line 4—4 of Fig. 1.

It is proposed to arrange proper graduations so that this position of the end of the sleeve 31 may be readily seen and read in terms of the fluid pressure. The graduations may be arranged on the exterior surface of the part 11 of the casing, as indicated at 42 in Fig. 2, or the graduations may be arranged on the sleeve 31 within the part 11 of the casing, as indicated at 43 in Fig. 3, while a suitable scale line 44 is placed on the outside of the casing. This latter arrangement may be preferable in some instances, since certain types of transparent material would act to magnify the numbers on the sleeve 31 and thereby permit an easier reading of the gauge.

In order to hold the sleeve 31 in the position in which it has been moved by the piston head and until the reading of the gauge is taken, a spring holding means is provided. This means comprises the spring 45 having a curved end portion 46 arranged to frictionally engage the inner surface of the sleeve 31.

The spring 45 at its opposite end is provided with a reversely bent portion 47 having at its end an inwardly extending part 48 secured to the part 11 of the casing. It should be noted that the cap 19 is spaced away from the end of the part 11 of the casing so as to accommodate the reversely bent portion 47 of the spring, this latter portion extending outwardly and radially of the casing so as to overlie the end of the part 11 as clearly indicated at 49. When it is desired to return the sleeve 31 to its normal or original position, the operator of the gauge merely depresses the cap 19 which, being of flexible metal, acts upon the portion 47 of the spring so as to compress the same and cause the spring 45 to fulcrum on the end of the part 11 and relieve the frictional engagement between the end 46 of the spring and the sleeve 31 whereof the sleeve may be returned to its original position by gravity.

Although a preferred embodiment of the invention has been illustrated and described herein, it should be understood that the invention is susceptible of various modifications and adaptations within the scope of the appended claims.

Having thus described my invention, I claim:

1. A pressure gauge comprising a tubular casing formed of two parts arranged in longitudinal extension of each other and having their adjacent ends interfitting, one of said parts being formed of transparent material and having a bore of less diameter than the bore of the other part, a sleeve slidable in the transparent part and projecting into the bore of the other part, a piston slidable in the last named part and arranged to engage with said sleeve when moved in one direction, a spring in said last named part and having one end abutting said piston and its opposite end abutting the end of said other part, and means for introducing fluid pressure into said piston containing part.

2. A pressure gauge comprising a tubular casing formed of two parts arranged in longitudinal extension of each other and having their adjacent ends interfitting, one of said parts being formed of transparent material and having a bore of less diameter than the bore of the other part, a sleeve slidable in the transparent part and having an end projecting into the other part and provided with an adjustable extension, a piston slidable in the last named part and arranged to engage the said extension when moved in one direction, a spring in said last named part having one end abutting said piston and its opposite end abutting the end of said other part, and means for introducing fluid pressure into said piston containing part.

3. A pressure gauge comprising a tubular casing formed of two parts arranged in longitudinal extension of each other and having their adjacent ends interfitting, one of said parts being formed of transparent material and having a bore of less diameter than the bore of the other part, a movable cap arranged on the outer end of the transparent part, an air chuck arranged at the outer end of the other part, a sleeve slidable in the transparent part and projecting into the other part, a piston slidable in the last named part and arranged to engage with said sleeve when moved in one direction, a coil spring in said last named part having one end abutting said piston and its opposite end abutting the end of said transparent part, and a spring carried by said transparent part and having a portion arranged to frictionally engage said sleeve, said last named spring and said cap having cooperating portions effective upon inward movement of said cap to release the frictional engagement between said spring and said sleeve.

4. A pressure gauge comprising a tubular casing formed of two parts one of which is of transparent material and has a reduced end fitting within an end of the other part, said interfitting ends having cooperating portions securing said parts together, a cap member movably arranged over the free end of said transparent part, an air chuck secured to the free end of the other of said parts, said transparent part having a bore of less diameter than the bore of the other part, a sleeve slidable in the transparent part and having an end projecting into the other part and provided with an adjustable extension, a piston slidable in the last named part and arranged to engage with said extension when moved in one direction, a coil spring in said last named part having one end abutting said piston and its opposite end abutting the end of said transparent part, and a spring carried by said transparent part and having a portion frictionally engaging said sleeve, said last named spring and said cap member having cooperating portions effective when said cap member is moved inwardly of the transparent part to release the frictional engagement between said last named spring and said sleeve.

5. In a pressure gauge, an elongated tubular casing comprising two parts one of which is formed of transparent material, said parts being of substantially the same external diameter, one of said parts having a reduced end fitting within an end of the other part, said interfitting ends having cooperating portions securing said parts together, an air chuck secured to the free end of one of said parts, the other of said parts having an annular groove adjacent its free end, and a cap member movably arranged over the free end of said last named part and having an inturned flange extending into the said groove therein.

6. A pressure gauge comprising, a tubular casing formed of two parts arranged in longitudinal extension of each other with one of the parts formed of transparent material, one of said parts having a bore of less diameter than the bore in the other part, a sleeve slidably arranged in the part having the smaller bore and projecting into the bore of the other part, a piston slidable in said casing and arranged to engage with said sleeve when moved in one direction, a spring in said casing for moving said piston in the opposite direction, and means for introducing fluid pressure into said casing to actuate said piston.

7. A pressure gauge comprising, a tubular casing having an air chuck at one end thereof and a cap movably mounted on its opposite end and closing the same, a sleeve and a piston slidable in said casing and arranged to be engaged with each other when the piston moves in one direction, a coil spring for moving the piston in the opposite direction, and a spring having a portion frictionally engaging said sleeve and another portion fulcrumed on the end of said casing adjacent to said cap, said last named spring and said cap having cooperating portions effective upon inward movement of said cap to move said spring on its fulcrum to release the frictional engagement between the said spring and said sleeve.

In testimony whereof, I hereunto affix my signature.

JOHN C. CROWLEY.